United States Patent
Sohn

(10) Patent No.: US 7,172,279 B1
(45) Date of Patent: Feb. 6, 2007

(54) SAFETY EYEGLASSES WITH INTEGRAL SIDE SHIELD AND TEMPLE

(75) Inventor: Chung Be Sohn, Taegu (KR)

(73) Assignee: Eureka Co., Ltd., Dalseogoo Taegu (KR)

( * ) Notice: Subject to any disclaimer, the term of this patent is extended or adjusted under 35 U.S.C. 154(b) by 0 days.

(21) Appl. No.: 11/307,651

(22) Filed: Feb. 15, 2006

(51) Int. Cl.
*G02C 7/10* (2006.01)

(52) U.S. Cl. .................. 351/44; 2/13; 2/449

(58) Field of Classification Search ............ 351/44, 351/41, 158, 111, 121; 2/13, 440, 449, 431; 264/2.5, 2.6, 1.7
See application file for complete search history.

(56) References Cited

U.S. PATENT DOCUMENTS 5,543,864 A * 8/1996 Hirschman et al. ........... 351/47

6,159,397 A * 12/2000 Friedman .................... 264/1.7

* cited by examiner

*Primary Examiner*—Hung Xuan Dang
(74) *Attorney, Agent, or Firm*—John K. Park; Park Law Firm

(57) ABSTRACT

Safety eyeglasses having a metal frame are provided with integrally molded side shields. The frame includes a lens frame, a pair of metal temples hingedly connected on opposing sides of the lens frame, and side shields formed from a hardenable, liquid transparent resin material integrally connected to a mounting portion of the metal temples in the vicinity of the hinge connection. The mounting portion of the metal temples includes discontinuities which preferably take the form of a plurality of grooves to form an interference type joint between a fixing portion of the side shields that is molded around the grooved mounting portion to permanently join the side shields to the metal temples.

6 Claims, 3 Drawing Sheets

SAFETY EYEGLASSES WITH INTEGRAL SIDE SHIELD AND TEMPLE

BACKGROUND OF THE INVENTION

1. Field of the Invention

The present invention relates to safety eyeglasses having side shields capable of protecting the eyes of a wearer from foreign substances in work environments, and more particularly, to safety eyeglasses with side shields formed from a moldable plastic that is integrally joined to metal temples of an eyeglass frame.

2. Background of the Related Art

As is well known, in certain working environments involving grinding operations or the handling of particulate substances, there is a possibility of foreign substances striking the eyes of an eyeglass wearer through the sides of the eyeglasses, thereby causing injury or irritation to the eyes and the surrounding skin. To prevent such problems, side shields are attached to the temples of the eyeglasses.

Such side shields typically have a length of about 5 cm extending from the hinge connection between the side of the eyeglasses frame toward the end portion of the temple that rests on the wearers ear, and are often made of a transparent synthetic resin material so as not to interfere with peripheral vision. They are generally mounted onto the eyeglasses temples in such a way as not to interfere with the folding of the temples. When the temples of the eyeglasses frame are made of a synthetic resin, the side shields may be formed as part of the temple in a one-step molding process. However, when the eyeglasses frame is made of metal in order to provide for a more stylish appearance, or to accommodate prescription lenses, such transparent, synthetic resin side shields are separately fabricated.

Side shields for safety eyeglasses having metal frames are either detachably or permanently connected to the metal temples. Detachable side shields may be designed to accommodate either a number of different types and sizes of metal eyeglasses frames, or they may be custom designed to fit a specific frame. Because of the broad variation in style, shape and temple dimensions of metal eyeglasses frames, it is difficult to design a "one size fits all" type side shield that detachably mounts securely on the temples all metal frames without having either a large, unsightly overlap between the side shield and the hinge portion of the frame, or a safety-compromising gap between the side shield and the frame. Even when such side shields are custom-designed to fit a particular type of frame, they must also be designed so that the forces associated with their installation or removal are relatively low, since many metal frames are relatively fragile, and are prone to bending or breakage and subjected to the pushing and pulling necessary for detachable operation. Finally, since many workers simply provide for themselves separate safety eyeglasses for use in jobs or other specialized environments requiring such eyeglasses, the detachable feature of such side shields often goes unused.

While the provision of permanent side shields that are custom designed with specific shape of a particular eyeglasses frame solves some of the aforementioned problems, other problems remain. For example, any locking mechanism that is capable of reliably securing the side shields onto the metal temples of a frame with a minimal amount of force requires small and accurately made components, such as the combination of a precision-made locking protrusion and complementary groove between the side shields and the temples. To avoid the expensive machining associated with small locking components, fasteners such as rivets and screws have been used in the prior art. Unfortunately, such fasteners require the provision of small precision holes in the metal temples which are time consuming to manufacture and to mate with the fasteners, and which also provide points of structural weakness within the temples. Of course, such problems might be reduced by widening the temples where they connect to the side shields in order to simplify the connecting process. However, such an approach requires the custom-manufacturing of the temples for a given type of eyeglass frame, and impedes peripheral vision.

Clearly, what is needed is technique for easily and permanently attaching transparent resin side shields onto the temples of metal eyeglass frames which does not require a widening or other custom-manufacturing of the temples of such frames in the area of side shield connection, and which is easily applied to a broad range of presently existing shapes, styles and temple dimensions. Ideally, such a technique would securely mount the side shields onto the metal temples for the lifetime of the frames without slippage or disconnection. Finally, it would be desirable if such a technique required a minimum amount of manufacturing steps and precision machining in order to minimize the cost of application.

SUMMARY OF THE INVENTION

Accordingly, the present invention has been made in view of the above-mentioned problems occurring in the prior art, and it is an object of the present invention to provide safety eyeglasses having metal frames with a side shield in which in a metal eyeglasses temple is permanently and integrally joined with a side shield formed of synthetic resin, thereby making it convenient to manufacture and manage metal frame safety eyeglasses with side shields.

To accomplish the above object, according to the present invention, there are provided safety eyeglasses having a lens frame, a pair of temples hingedly connected to the lens frame, and a pair of side shields, the temples including discontinuities such as a plurality of grooves formed on a mounting portion in the vicinity of the hinge portion of the eyeglasses temple irrespective of the structure of the hinge portion, the plurality of grooves being filled with the same synthetic resin solution used to form the shield during the molding of the shield, thereby permitting fixing the side shield onto the eyeglasses temple upon the hardening of the resin solution. Preferably, the side shield includes an elongated concave portion for mounting the eyeglasses temple thereon and a fixing portion of the concave portion for fully surrounding the mounting portion of the eyeglasses temple having the plurality of grooves formed thereon, whereby as the plurality of grooves of the eyeglasses temple are filled and hardened with the synthetic resin solution, the eyeglasses temple and the side shield are integrally joined with each other.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
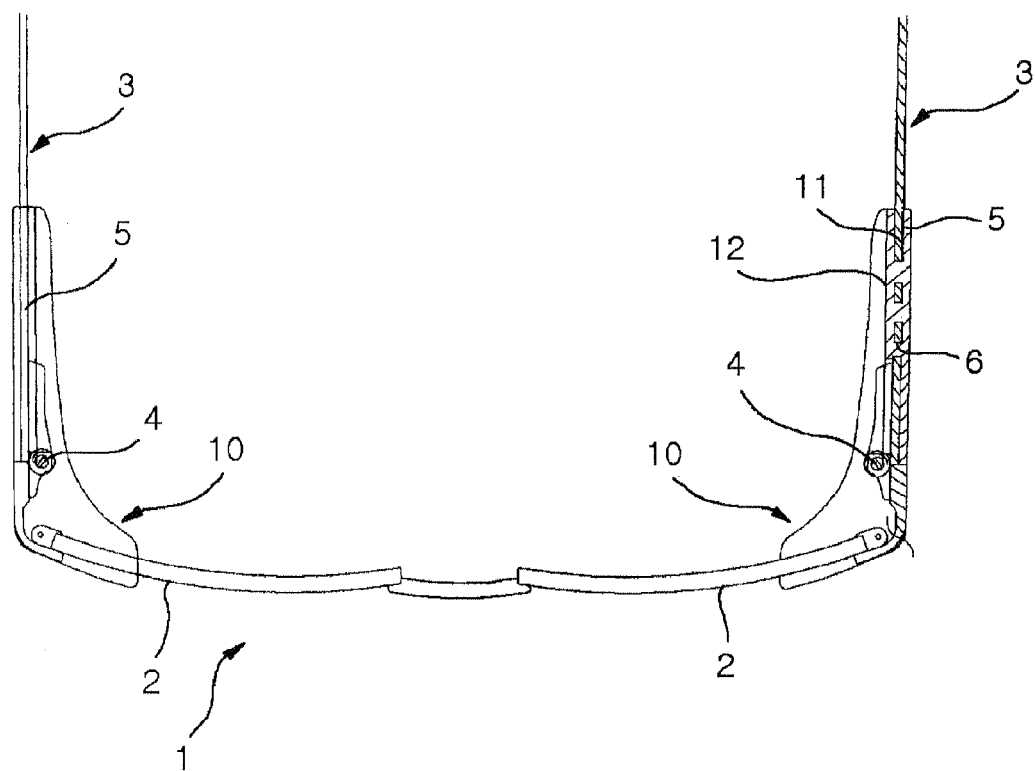
FIG. 1 is a plane view showing safety eyeglasses according to a preferred embodiment of the present invention.
Figure 2:
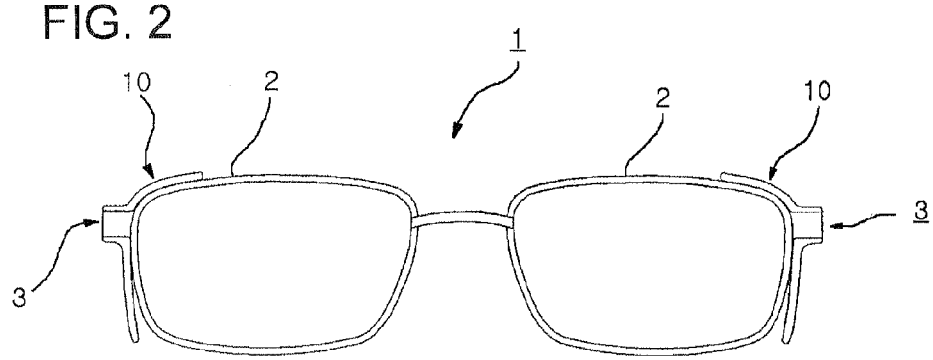
FIG. 2 is a front view showing the safety eyeglasses according to the preferred embodiment of the present invention.

With reference in particular to FIGS. 1 and 2, the present invention relates to safety eyeglasses 1 including a lens frame 2, an eyeglasses temple 3, and a side shield 10.

According to the present invention, upon making the eyeglasses temple 3 of the safety eyeglasses 1, discontinuities in the form of a plurality of grooves 6 are formed on a mounting portion that corresponds to flat portion 5 of the eyeglasses temple 3 in the vicinity of a hinge portion 4 of the eyeglasses temple 3 irrespective of the structure of the hinge portion 4 such that when a synthetic resin solution that forms at least part of the side shield 10 is poured and hardened into the plurality of grooves 6, the side shield 10 is affixed onto the eyeglasses temple 3. In this application, while such grooves are a preferred form of discontinuity in the flat portion 5 of the temple 3, other forms of discontinuities may be used, including but not limited to protrusions, holes, slots, depressions, ridges, bores that extend either partially or completely through the thickness of the flat portion 5, scratches and notches, or any combination thereof, either in a pattern or at random. All such discontinuities are within the scope of this invention so long as the interface between the discontinuity and the hardened resin or other material forming the side shield 10 forms an interference type joint between the side shield 10 and flat portion 5 of the temple 3.

In the preferred manufacturing process of the invention, the eyeglasses temple 3 is first mounted on an injection mold, and the synthetic resin solution is poured into the injection mold thereby forming the side shield 10. The side shield 10 preferably includes an elongated concave portion 11 along which the eyeglasses temple 3 is mounted and a fixing portion 12 of the concave portion 11 for fully surrounding the flat portion 5 of the eyeglasses temple 3 having the plurality of grooves 6 formed thereon, and under the above construction, as the injection solution is filled and hardened into the grooves 6 of the eyeglasses temple 3, the eyeglasses temple 3 and the side shield 10 are integrally formed with each other. In an alternative manufacturing process, the side shield 10 may initially be formed separate from the metal temple 3 without the fixing portion 12. The side shield 10 may then be joined to the flat portion 5 of the eyeglasses temple 3 by the fabrication of the fixing portion from the pouring and hardening of a synthetic resin solution that is the same or compatible with the resin or other material forming the side shield 10.

Figure 3:
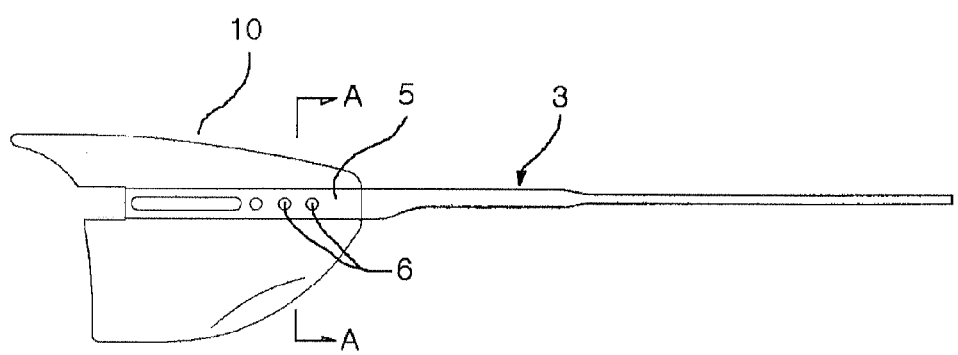
FIG. 3 is a side view showing the safety eyeglasses according to the preferred embodiment of the present invention.
Figure 4:
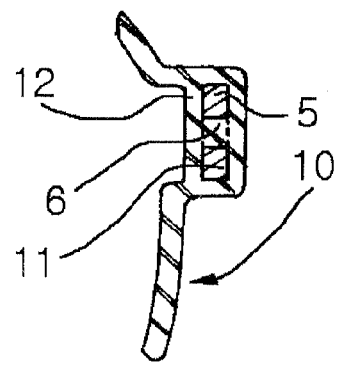
FIG. 4 is an enlarged sectional view showing the line A—A of FIG. 3.
Figure 5:
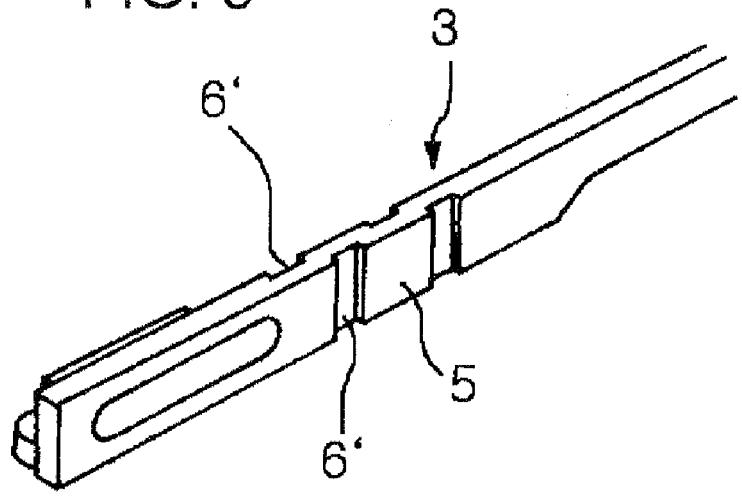
FIGS. 5 and 6 are partly perspective views showing other examples of grooves adopted in the preferred embodiment of the present invention.
Figure 6:
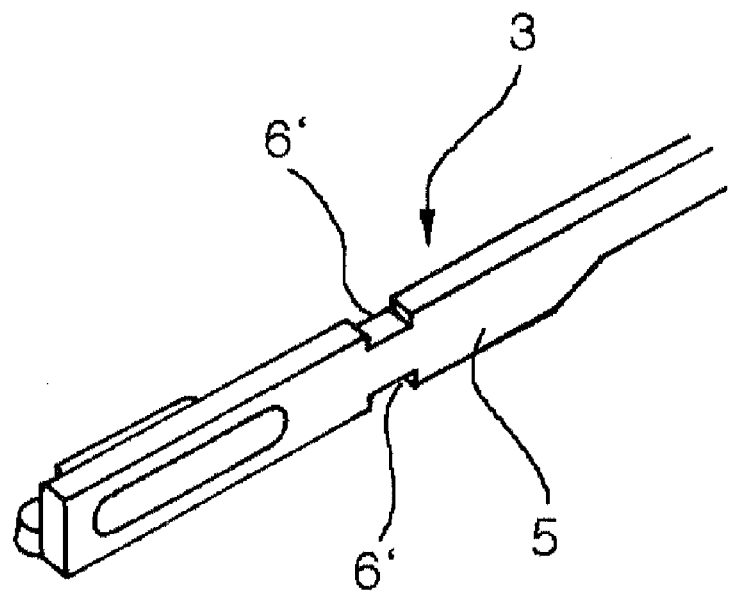

The plurality of grooves 6 that are filled with the injection solution are basically formed as holes as shown in FIGS. 3 and 4, but may be formed in such a manner as to be concave on the upper and lower surfaces or the sides of the flat portion 5 of the eyeglasses temple 3 as shown in FIGS. 5 and 6, which of course achieves the same effect as shown in FIGS. 3 and 4.

In making the safety eyeglasses with the side shield formed integrally therewith, according to the present invention, the eyeglasses temple 3 on which the plurality of grooves 6 are formed is first made and then, at a state where the eyeglasses temple 3 is mounted on an injection mold, injection molding is carried out. As a result, the injection solution is filled and hardened into the grooves 6, thereby making the eyeglasses temple 3 integrally formed with the side shield 10. This enables the manufacturing process and management system to be very simpler than those in conventional safety eyeglasses.

Also, there is no need for the precision in constructing the locking means on the eyeglasses leg and the side shield, and no riveting for integrally forming the eyeglasses temple and the side shield is carried out. There is no need for the plurality of grooves 6 to be of any particular size, shape or depth or any particular distance to one another. Such grooves may be made in imprecisely on the eyeglasses temple 3, and will still achieve complete integration with the side shield 10 by means of injection molding, which enables the production costs of the safety eyeglasses to be substantially low.

Furthermore, a seller or buyer does not need to connect the eyeglasses frame with the side shield, which making it convenient to sell or buy the safety eyeglasses of this invention.

As set forth in the foregoing, the safety eyeglasses according to the present invention can be formed integrally with the side shield in a very simple manner, thereby decreasing the production costs to provide a substantially low-priced product, and can be easily manufactured and managed, thereby making it convenient to sell and buy to provide great satisfaction to all of the maker, seller, and buyer.

While the present invention has been described with reference to the particular illustrative embodiments, it is not to be restricted by the embodiments but only by the appended claims, and therefore, it is to be understood that other modifications and variations may be made without departing from the substance and scope of the present invention, as those skilled in the art will readily understand. Such alternate modifications and variations are within the scope of the present invention which is intended to be limited only by the appended claims and equivalents thereof.

What is claimed is:

1. A safety eyeglasses frame, comprising:
   a lens frame;
   a pair of temples pivotally connected on opposing sides of said lens frame, each of which has a mounting portion for mounting a side shield,
   a pair of side shields, each of which has a fixing portion formed from a hardenable, moldable material, that is different from a matrial forming said mounting portion of said temples
   wherein said mounting portion of each of said temples includes discontinuities that form an interference-type joint between said temples and said side shield when said material forming said fixing portion is molded and hardened over said mounting portion.

2. A safety eyeglasses frame as defined in claim 1, wherein said temples are formed from metal.

3. A safety eyeglasses frame as defined in claim 2, wherein said side shields are completely formed of the same hardenable, moldable material forming said fixing portion.

4. A safety eyeglasses frame as defined in claim 2, wherein said fixing portion extends completely across an elongated portion of said side shields.

5. A safety eyeglasses frame as defined in claim 2, wherein said discontinuities are selected from one or more of the group consisting of grooves, ridges, cavities, depressions, protuberances, holes and slots.

6. A safety eyeglasses frame as defined in claim 5, wherein said holes and slots penetrate either partially or completely through a thickness of said mounting portion of said temple.

* * * * *